UNITED STATES PATENT OFFICE.

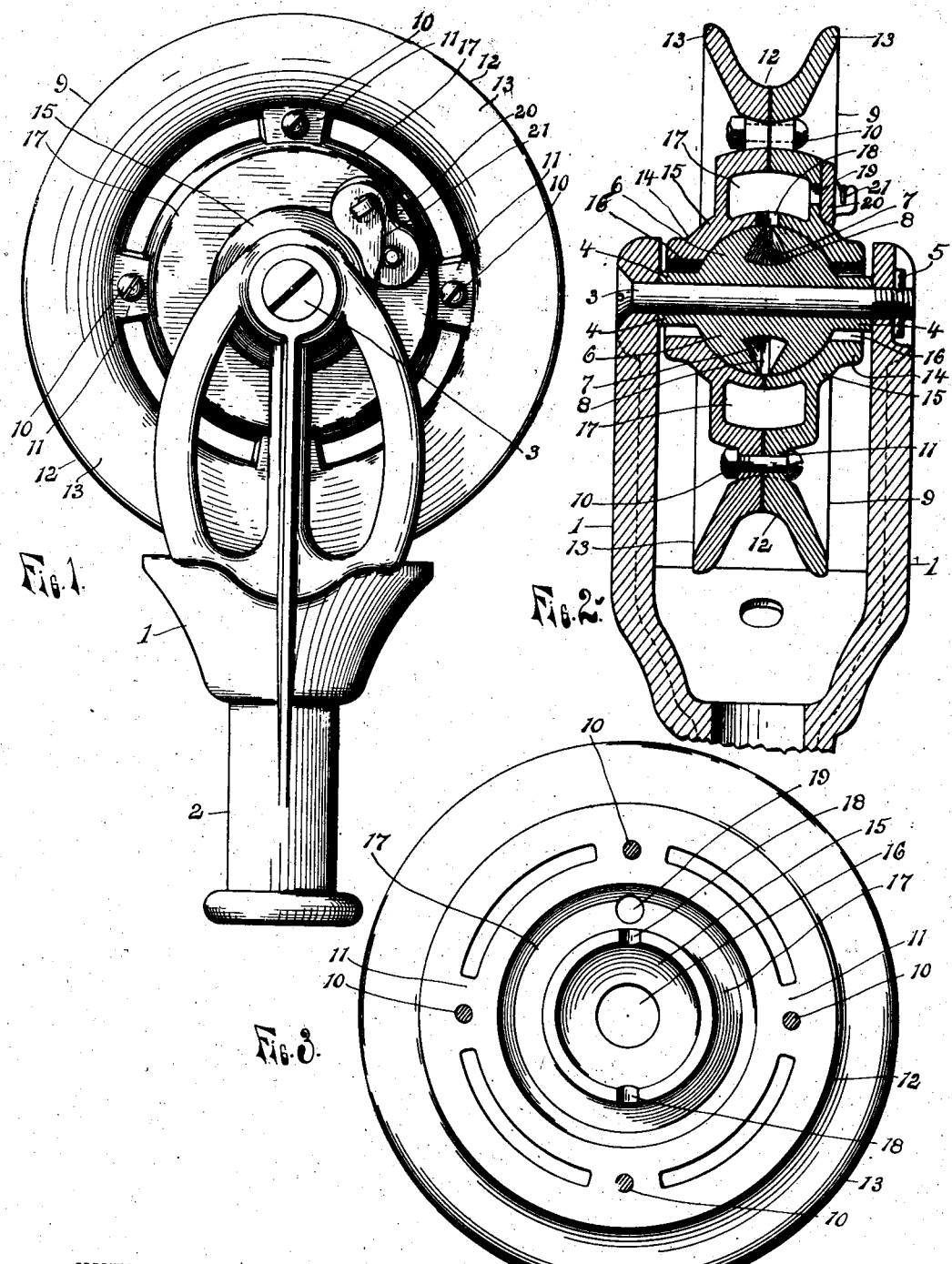

HENRY L. HUMPHREY, OF MONROE, MICHIGAN.

TROLLEY-WHEEL.

No. 834,302.   Specification of Letters Patent.   Patented Oct. 30, 1906.

Application filed November 13, 1905. Serial No. 287,009.

*To all whom it may concern:*

Be it known that I, HENRY L. HUMPHREY, a citizen of the United States of America, residing at Monroe, in the county of Monroe and State of Michigan, have invented certain new and useful Improvements in Trolley-Wheels, of which the following is a specification, reference being had therein to the accompanying drawings.

This invention relates to improvements in trolley-wheels; and its object is to provide a wheel which is free to rotate and has a limited lateral rocking or universal movement to permit the wheel to more readily follow the trolley-wire, and thus prevent its running off, and to also lessen the friction and consequent wear. This limited universal movement of the wheel also permits the wheel in going around curves to turn independently of the trolley-pole enough to bring its plane of rotation as nearly in longitudinal alinement with the wire as possible, thus eliminating from this wheel the tendency of the wheel as ordinarily constructed to run off and to bind the wire between its flanges, owing to the divergence of the direction of the wire and the direction of the plane of rotation of the wheel.

A further object of this invention is to prevent undue wear of the wheel-bearing by providing an extended bearing-surface and by providing an oil-reservoir and channels to conduct the oil to the surface to be lubricated.

To this end the invention consists in providing a ball-and-socket bearing or journal for the wheel upon which it revolves freely and is free to turn or tilt laterally a limited distance, the ball furnishing an extended bearing-surface and a suitable groove or chamber in the ball supplying oil to its surface to lubricate the same; and the invention further consists in the novel construction, arrangement, and combination of parts, all as hereinafter more fully described, and shown in the accompanying drawings, in which—

Figure 1 is a side elevation of a device embodying the invention; Fig. 2, a transverse section of the same through the axis of the wheel, and Fig. 3 is an elevation of one-half of the wheel detached and showing the inner surface thereof.

As shown in the drawings, 1 is the harp or yoke in which the wheel is supported, the same being provided with a socket portion 2 to receive a trolley-pole and the upper end of one of the arms thereof with a countersunk hole to receive a tie-bolt 3, having a screw-head to engage the countersink, the opposite arm being provided with a screw-threaded opening to receive the screw-threaded end of said bolt. Upon this bolt 3 is a sleeve 4, which is held from turning thereon by the bolt, which draws the arms of the harp into contact with the ends of the sleeve and firmly clamps it between, a cotter-pin 5 being provided to engage a hole in the projecting screw-threaded end of the bolt and to lie within a groove in the arm to prevent the bolt from turning when fully turned in to clamp the sleeve. Intermediate its ends the sleeve 4 is formed with an integral spherical enlargement or ball 6, formed with a circumferential groove 7, which in cross-section is triangular in form, with the apex of the triangle cutting the surface of the ball and forming a narrow slot 8 therein all the way around the ball.

The trolley-wheel 9 is made in halves secured together by bolts 10, extending through openings in its spokes 11, which connect its rim 12, formed with side flanges 13 to form a circumferential groove for the trolley-wire, with the hub portion of the wheel.

The hub 14 of the wheel is formed with a hollow spherical enlargement 15, forming when the two halves of the wheel are secured together a socket to receive the ball 6, and said hub extends laterally toward each arm of the harp, and the internal diameter of its bore 16 is made considerably greater than the diameter of the sleeve 4, so as to permit the wheel to not only rotate upon said ball alone without contacting the sleeve, but to turn laterally thereon, such lateral movement being limited by the hub coming in contact with the sleeve.

Formed around the socket portion 15 of the hub is a circular oil-chamber 17, which communicates with the groove 7 in the ball through openings 18 in the wall of the socket. Oil is thus supplied to the groove from this chamber while the wheel is standing still, as the centrifugal force will keep the oil in the chamber from entering the groove while the wheel is in motion, and oil will be supplied to the bearing-surface of the ball and socket through the slot 8 from said groove while the wheel is in motion, as said ball is held from turning, and therefore the centrifugal force of the revolving wheel will not affect the oil in the groove and it will pass through the slot to the bearing-surface, effectually lubricating the same.

Oil is introduced into the chamber 17 through an opening 19 in its side, which opening is closed by a cap 20, held in place over the opening by a spring 21.

Having thus fully described my invention, what I claim is—

1. The combination with a trolley-wheel, of a fixed support for said wheel having a circumferential groove formed triangular in cross-section with the apex of said triangle cutting the surface of the support to form a slot therein, and a hub portion on the wheel to receive and turn upon said support.

2. The combination with a trolley-wheel, of a fixed ball having a circumferential groove formed triangular in cross-section with the apex of said triangle cutting the surface of the ball to form a slot therein, a hub on the wheel forming a socket to receive the ball, and an oil-chamber on the wheel surrounding the hub and communicating through openings in the wall of the hub with said groove in the ball.

3. The combination with a trolley-harp, of a sleeve formed with a spherical enlargement having a circumferential groove formed triangular in cross-section with the apex of the triangle cutting the surface of the sphere and forming a slot therein, a binding-bolt extending through said sleeve and openings in the harp, a trolley-wheel made in halves and formed with a laterally-extending hub portion having an enlarged portion forming a socket for the sphere and having a bore of greater diameter than the diameter of the sleeve at each side of said spherical portion, an oil-chamber around the socket portion of the hub and communicating through openings in the wall of said socket with the groove in the spherical portion, spokes connecting the rim and said chamber, and bolts extending through openings in the spokes to secure the halves of the wheel together.

In testimony whereof I affix my signature in presence of two witnesses.

HENRY L. HUMPHREY.

Witnesses:
   THOS. G. LONGSTAFF,
   OTTO F. BARTHEL.